(12) United States Patent
Knaup et al.

(10) Patent No.: US 6,623,055 B2
(45) Date of Patent: Sep. 23, 2003

(54) BUMPER FOR A MOTOR VEHICLE

(75) Inventors: Hans-Jürgen Knaup, Bad Lippspringe (DE); Oliver Müller, Paderborn (DE); Hui Wang, Paderborn (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 09/978,884

(22) Filed: Oct. 16, 2001

(65) Prior Publication Data

US 2003/0015880 A1 Jan. 23, 2003

(30) Foreign Application Priority Data

Jul. 17, 2001 (EP) .............................................. 01117242

(51) Int. Cl.⁷ ............................................... B60R 19/02
(52) U.S. Cl. ....................................... 293/102; 293/132
(58) Field of Search ................................ 293/102, 120, 293/132, 154

(56) References Cited

U.S. PATENT DOCUMENTS 3,897,095 A * 7/1975 Glance et al. ............... 293/120
4,641,872 A * 2/1987 Lohr et al. ................... 293/133
5,785,367 A * 7/1998 Baumann et al. ............ 293/133
6,179,355 B1 1/2001 Chou et al.
6,199,937 B1 3/2001 Zetouna et al.
6,315,339 B1 * 11/2001 Devilliers et al. ........... 293/120
6,406,079 B2 * 6/2002 Tamada et al. .............. 293/120

FOREIGN PATENT DOCUMENTS

| DE | 43 07 836 A | 9/1993 |
| DE | 44 13 641 C1 | 6/1995 |
| DE | 196 43 049 A1 | 4/1998 |
| DE | 198 49 358 A | 5/2000 |
| DE | 10002379 A1 * | 8/2001 |

* cited by examiner

Primary Examiner—D. Glenn Dayoan
Assistant Examiner—Jason Morrow
(74) Attorney, Agent, or Firm—Henry M. Feiereisen

(57) ABSTRACT

A bumper for a motor vehicle, includes a cross member for attachment to longitudinal members of a vehicle chassis. The cross member is defined by a length and has a shell element extending over a major part of the length of the cross member, wherein the shell element has incorporated therein at least one deep-drawn reinforcement member of cup shape configuration.

12 Claims, 1 Drawing Sheet

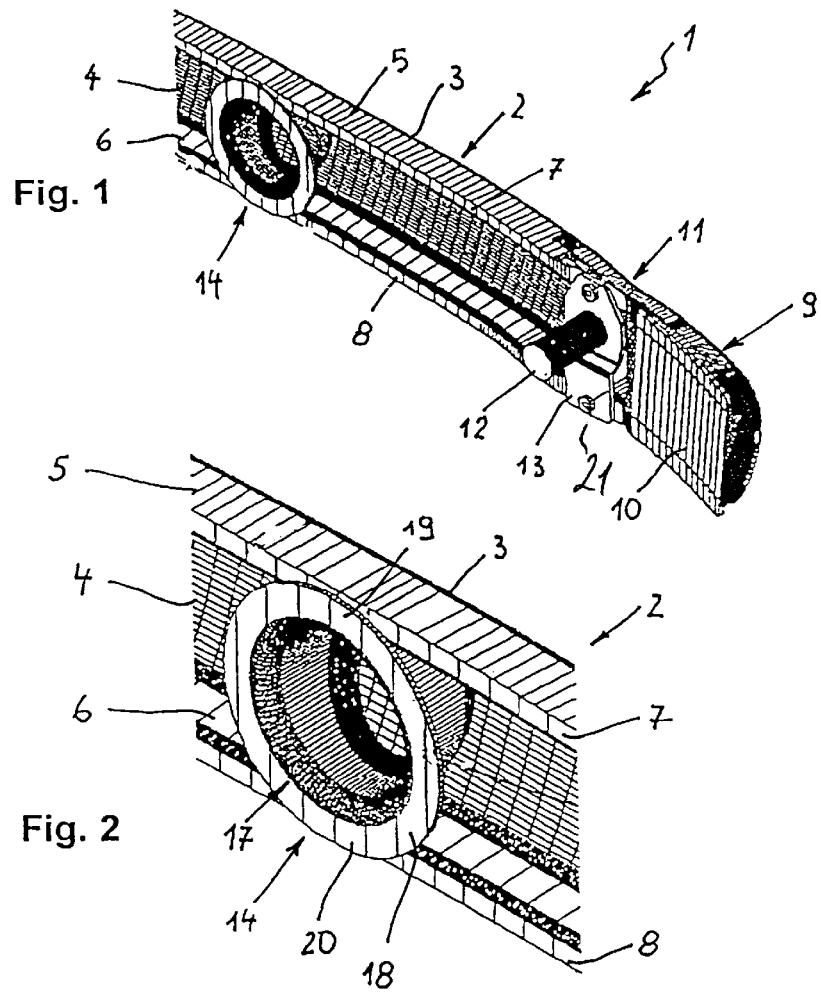
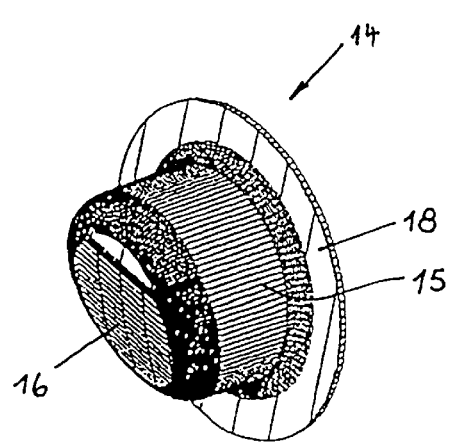
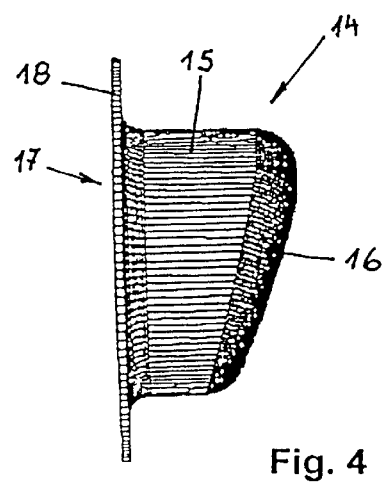
Fig. 1
Fig. 2
Fig. 3
Fig. 4

BUMPER FOR A MOTOR VEHICLE

CROSS-REFERENCES TO RELATED APPLICATIONS

This application claims the priority of European Patent Application, Serial No. 011 17 242.6, filed Jul. 17, 2001, the subject matter of which is incorporated herein by reference.

BACKGROUND OF THE INVENTION

The present invention relates, in general, to a bumper for a motor vehicle, and in particular to a bumper of a type having a cross member for attachment to longitudinal members of a vehicle chassis, wherein the cross member has a shell element, which extends over a major part of the length of the cross member.

Bumpers are arranged across the front and rear of a motor vehicle between the plastic casing, forming an end piece of the body, and the chassis of the motor vehicle, and are provided to prevent damage in the event of a low speed impact. Oftentimes, impact absorbers, so called crash boxes, are disposed between the cross member and the longitudinal members, to absorb the energy in the event of a collision by converting the impact energy into deformation work.

German Pat. No. DE 44 13 641 C1 describes a bumper which is provided with a cross member to form an energy absorber. The cross member has a split configuration and includes a C-shaped rear part for attachment to the vehicle body and a flat end panel which covers the rear part. Arranged at the front side of the cross member is an impact body in the form of a solid profile spanning over the length of the cross member and made of a material, e.g. plastic foam or a honeycomb structure of plastic, intended to absorb energy.

German Pat. No. 196 43 049 A1 describes a bumper having a cross member in the form of a hollow profile composed of two U-shaped profiled shells. Disposed in the shells are reinforcing inlays which are provided in the neutral fiber with lateral slits. In addition, angled reinforcement strips are arranged at the attachment points.

Reinforcements integrated in the cross member are capable to limit damage in the event of a collision at slight speed. Tests have shown that, for example, at an impact speed of 4 km/h against a pendulum or a barrier, the reinforcements protect the cross member and the vehicle from damage. The demand on reinforcements is in particular high when U.S. automobiles are concerned. An established test, commonly called pole crash test, has been developed in which an automobile is pulled at a speed of 8 km/h backwards against a pole. The determined damage is evaluated and used in concert with other tests to assess the discount category for insurance purposes.

It would be desirable and advantageous to, provide an improved bumper with increased stiffness and strength to limit damage in particular when used as rear bumper.

SUMMARY OF THE INVENTION

According to one aspect of the present invention, a bumper includes a cross member for attachment to longitudinal members of a vehicle chassis, wherein the cross member has a shell element spanning over a major part of the length of the cross member, wherein the shell element has incorporated therein at least one deep-drawn reinforcement member of cup shaped configuration.

According to another feature of the present invention, the reinforcement member may be made of sheet steel. Production can be carried out on a large scale in an economical and cost-efficient manner. The cross member and the components of the reinforcement member may be fabricated in separate operations. Subsequently, the components of the reinforcement member are positioned in the cross member and joined thereto. The geometric configuration of the reinforcement member can be best suited to the cross member at hand as far as moment of resistance as well as strength behavior and stiffness behavior are concerned. Depending on the demand on motor vehicles, it is, of course, possible to integrate several reinforcement members in suitable locations. For convenience and sake of simplicity, much of the following description will be made in relation to one reinforcement member. Of course, it will be understood that the principles described in the following description with respect to one reinforcement member are equally applicable to the arrangement of more than one reinforcement member.

The geometry of reinforcement member may vary. Oval, round or rectangular cylindrical cross sections are conceivable. The reinforcement member may be partially integrated in the cross member and enables a targeted configuration to suit the stiffness behavior and strength behavior as well as bending pattern during impact. The stress behavior can be suited through coordination of number, geometry and position of reinforcement members.

The reinforcement member effects in concert with the cross member shell a doubling of the wall thickness and an increase of the wall thickness at critical locations of the bumpers so that bumpers in their entirety can be fabricated in a targeted manner to take into account expected force patterns in case of stress through impact or collision.

According to another feature of the present invention, the shell element may include a central web having opposite end faces, and two legs, with one leg extending from one end face of the web and the other leg extending from the other end face of the web, wherein the reinforcement member has an end wall configured to complement and to contact the web of the shell element. Suitably, the reinforcement member can be joined, e.g. welded, with the web to the inside of the shell. The reinforcement member may partially or fully contact the web. Practice has shown that a complete flat engagement of the end face of the reinforcement member upon the web is currently preferred. The contours of mutually contacting surfaces should be suited to one another.

According to another feature of the present invention, the shell element has flanges, and the reinforcement member is provided with a collar for attachment to the flanges. The attachment may be realized through spot welding or seam welding. Of course, other joining techniques, such as gluing or clinching, are also conceivable. Suitably, the flanges are directed inwardly toward the shell body.

According to another feature of the present invention, the reinforcement member may be heat-treated (quenching and tempering). This is especially advantageous when exposed to high stress and during crash like in a pole crash test.

The local attachment of the reinforcement member leads in a pole crash test to a reduction of the penetration depth of the pole in the event of impact. The bumper according to the present invention includes a configuration of the cross member that meets stress demands and functional demands. A diverting of the forces from the cross member to the impact absorber/crash boxes is ensured. As a consequence, damage is diminished and possible repair costs are reduced. Moreover, the weight of the cross member can be reduced. As the reinforcement member builds up resistance, the wall thickness of other components of the bumper assembly may be decreased. This may also have a positive effect on the overall weight. Furthermore, the reinforcement member assumes the function of an end panel for the shell-shaped cross member so as to the legs of the shell element are prevent from opening or spreading apart to the outside in the event of a collision.

BRIEF DESCRIPTION OF THE DRAWING

Other features and advantages of the present invention will be more readily apparent upon reading the following description of a preferred exemplified embodiment of the invention with reference to the accompanying drawing, in which:

FIG. 1 is a perspective illustration of a section of the backside of a cross member of a bumper according to the present invention;

FIG. 2 is a detailed perspective view, on an enlarged scale, of the cross member in the area of a reinforcement member;

FIG. 3 is a perspective end view of the reinforcement member; and

FIG. 4 is a side view of the reinforcement member.

DETAILED DESCRIPTION OF PREFERRED EMBODIMENTS

Throughout all the Figures, same or corresponding elements are generally indicated by same reference numerals.

Turning now to the drawing, and in particular to FIG. 1, there is shown a perspective illustration of a section of the vehicle-facing backside of a bumper according to the present invention, generally designated by reference numeral 1 and configured for attachment to a, not shown, motor vehicle. The bumper 1 includes a cross member, generally designated by reference numeral 2 and extending transversely to, not shown, longitudinal members of the motor vehicle. Over a major part of its length, the cross member 2 includes a shell element 3 of substantially U-shaped cross section. The shell element 3 is comprised of a central web 4 having two legs 5, 6, i.e. upper leg 5 and lower leg 6, which terminate in outwardly directed flanges 7, 8, respectively.

The cross member 2 has axial ends 9 which are each closed by an end panel 10. (only one is shown in the illustration of FIG. 1). Reference numeral 11 designates the attachment zone to a, not shown, crash box or one longitudinal member. The attachment zone 11 includes a pin-like coupler 12 as well as a mounting plate 13 which is bolted to the cross member 2 by screw fasteners 21. As shown in FIG. 1, the upper and lower legs 5, 6 are recessed inwardly in the attachment zone 11 to enhance stability.

Placed in the shell element 3 is a cup-shaped, deep-drawn reinforcement member 14, as can be seen in particular in FIG. 2. The reinforcement member 14, involved here, is a deep-drawn sheet steel element which has been tempered (heated and quenched) after the deep drawing operation. As shown in concert with FIG. 3, the reinforcement member 14 has a round cylindrical portion 15 with an end wall 16 of a configuration which complements the web 4 of the shell element 3 and is intended to close the reinforcement member 14 in the direction of the web 4. The end wall 16 is in full contact with the web 4 and joined with the web 4 by welding. As shown in particular in FIG. 4, the end wall 16 extends slantingly backwards in the drawing plane from top to bottom. The reinforcement member 14 has further an end wall distal end 17, which confronts the motor vehicle. The end 17 is open and includes a wrap-around collar 18 which extends radially outwards.

The collar 18 of the reinforcement member 14 has an upper portion 19 which bears against the flange 7, and a lower portion 20 which bears against the flange 8. Suitably, the upper and lower portions 19, 20 are welded to the flanges 7, 8, respectively. In this way, the reinforcement member 14 assumes the function of an end panel to prevent a spreading of the legs 5, 6 apart in the event of a collision.

The reinforcement member 14 is thus integrated in the shell element 3 and effects a partial reinforcement of the cross member 2 in critical areas. Through proper geometric configuration of the reinforcement member 14 under consideration of stress conditions, forces are diverted from the cross member 2 into the crash boxes. The cross member 2 has an improved stiffness and strength, so that the bumper reduces overall damage of the motor vehicle in the event of an impact.

While the invention has been illustrated and described as embodied in a bumper for a motor vehicle, it is not intended to be limited to the details shown since various modifications and structural changes may be made without departing in any way from the spirit of the present invention.

What is claimed as new and desired to be protected by Letters Patent is set forth in the appended claims:

What is claimed is:

1. A bumper for a motor vehicle, comprising a cross member for attachment to longitudinal members of a vehicle chassis, wherein the cross member is defined by a length and has a shell element, which extends over a major part of the length of the cross member and includes a central web and two legs connected to the web, wherein the shell element includes at least one reinforcement member configured to divert impact forces from the cross member to crash boxes on the longitudinal members, said reinforcement member having a cup-shaped configuration and including an end wall configured to complement a configuration of the web of the shell element and to contact the web of the shell element.

2. The bumper of claim 1, wherein the shell element has flanges, wherein the reinforcement member is provided with a collar attached to the flanges.

3. The bumper of claim 1, wherein the reinforcement member is tempered.

4. The bumper of claim 1, wherein the reinforcement member is made of sheet steel.

5. The bumper of claim 2, wherein the collar is attached to the flanges by a process selected from the group consisting of spot welding, seam welding, gluing and clinching.

6. The bumper of claim 1, wherein the shell element has a U-shaped configuration and includes a central web having opposite end faces, and two legs, one leg extending from one end face of the web and the other leg extending from the other end face of the web.

7. The bumper of claim 6, wherein the shell element has two flanges, one flange directed outwardly from one of the legs of the shell element, and the other flange directed outwardly from the other one of the legs of the shell element.

8. The bumper of claim 1, wherein the reinforcement member has a vehicle-distal side and a vehicle-proximal side, wherein the vehicle-distal side is formed by a slanted end wall for attachment to a complementary surface of the shell element.

9. The bumper of claim 8, wherein the end wall has an upper end and a lower end, wherein the end wall slants inwardly toward the vehicle-proximal side from the upper end to the lower end.

10. The bumper of claim 8, wherein the reinforcement member has a hollow cylindrical portion extending between the vehicle-distal side and a vehicle-proximal side.

11. The bumper of claim 8, wherein the vehicle-proximal side of the reinforcement member has a circumferential collar jutting out in a radial direction.

12. The bumper of claim 4, wherein the reinforcement member is made through a deep-drawing process.

* * * * *